(12) United States Patent
Baudasse (10) Patent No.: US 9,079,672 B2
(45) Date of Patent: Jul. 14, 2015

(54) THROUGH-PIVOT WITH FLEXIBLE ELEMENTS AND SPACECRAFT COMPRISING SUCH A PIVOT

(75) Inventor: Yannick Baudasse, Grasse (FR)

(73) Assignee: THALES, Neuilly-sur-Seine (FR)

( * ) Notice: Subject to any disclaimer, the term of this patent is extended or adjusted under 35 U.S.C. 154(b) by 377 days.

(21) Appl. No.: 12/782,225

(22) Filed: May 18, 2010

(65) Prior Publication Data

US 2010/0296862 A1 Nov. 25, 2010

(30) Foreign Application Priority Data

May 19, 2009 (FR) .................................. 09 02427

(51) Int. Cl.
- *F16D 1/00* (2006.01)
- *B64G 1/22* (2006.01)
- *B64G 1/66* (2006.01)
- *F16C 11/12* (2006.01)

(52) U.S. Cl.
CPC *B64G 1/222* (2013.01); *B64G 1/66* (2013.01); *F16C 11/12* (2013.01); *Y10T 403/54* (2015.01)

(58) Field of Classification Search
USPC ................ 403/221, 223, 225, 291–293, 330; 464/83, 89–91, 81, 100, 160
See application file for complete search history.

(56) References Cited

U.S. PATENT DOCUMENTS

| | | | |
|---|---|---|---|
| 2,901,703 A * | 8/1959 | Plunkett | 324/155 |
| 2,907,563 A | 10/1959 | Verde et al. | |
| 2,915,306 A * | 12/1959 | Hickman | 267/280 |
| 3,512,419 A * | 5/1970 | Stiles | 74/5 F |
| 3,545,286 A * | 12/1970 | Stenstrom | 248/604 |
| 4,499,778 A * | 2/1985 | Westhaver et al. | 74/5 F |
| 4,655,614 A * | 4/1987 | Schott | 384/220 |
| 5,529,277 A * | 6/1996 | Ostaszewski | 248/603 |
| 5,547,174 A * | 8/1996 | Bade et al. | 267/154 |
| 6,267,363 B1 | 7/2001 | Genequand et al. | |
| 6,901,799 B2 * | 6/2005 | Chen et al. | 73/504.13 |
| 7,394,009 B2 * | 7/2008 | Judd | 84/421 |
| 2003/0235460 A1 | 12/2003 | Moon et al. | |
| 2008/0205976 A1 * | 8/2008 | Jeandot et al. | 403/164 |

FOREIGN PATENT DOCUMENTS

| | | |
|---|---|---|
| EP | 0 974 761 A1 | 1/2000 |
| FR | 2 703 415 A1 | 10/1994 |
| FR | 2 913 078 A1 | 8/2008 |

* cited by examiner

*Primary Examiner* — Greg Binda
*Assistant Examiner* — Nahid Amiri
(74) *Attorney, Agent, or Firm* — Baker and Hostetler LLP (57) ABSTRACT

The through-pivot comprises a first ring and a second ring, one of the two rings being able to rotate about a longitudinal axis with respect to the other ring. The pivot further comprises at least one floating frame. The two rings are connected to the floating frame by at least one first set and, respectively, by at least one second set, of several flexible elements running in a direction that is transverse to the two rings. The floating frame may be made up of a ring in the form of a cylinder of revolution about the axis, or of ring portion, it being possible for the floating frame to be positioned either on the inside or on the outside of the rings indifferently.

20 Claims, 9 Drawing Sheets

といった具合に...

THROUGH-PIVOT WITH FLEXIBLE ELEMENTS AND SPACECRAFT COMPRISING SUCH A PIVOT

CROSS-REFERENCE TO RELATED APPLICATIONS

This application claims priority to foreign France patent application No. 0902427, filed on May 19, 2009, the disclosure of which is hereby incorporated by reference in its entirety.

FIELD OF THE INVENTION

The present invention relates to a through-pivot, that is to say to a device able to support a rotary shaft which extends out of both ends of the pivot or between two pivots, and to a spacecraft comprising at least one such pivot. The invention applies to the field of spacecraft such as satellites for the fine rotational guidance of at least one element or piece of equipment of the spacecraft, in a predetermined direction of pointing.

BACKGROUND OF THE INVENTION

In space applications, it is necessary to be able to orientate certain elements, such as an antenna, a mast or a piece of equipment for example, of a satellite or of a space vehicle, in a predetermined direction in order, for example, to aim them towards an external target such as a planet, a receiver or an emitter, to keep them pointed towards a point on the surface of the earth, or alternatively to scan a particular region on the surface of the earth or of some celestial body. These positionings have often to be corrected in order to compensate for inevitable drift in the ability to maintain this direction and these numerous corrections mean that these space appendages and their supporting devices have to go through a high number of micro-rotation cycles. This phase is known as the fine pointing phase.

Given that placing a satellite into orbit is an irreversible operation, it is necessary, when designing the spacecraft, to ensure that these supporting devices will have a very long life, measured in terms of number of cycles, so as to guarantee their ability to withstand all these repeated stresses. For example, the life may exceed 300 000 cycles. Other requirements of the supporting devices include good mechanical integrity notably with regard to the external forces and bending moments applied to the supported shaft, good transverse rigidity, high-precision play-free guidance, significant amplitude of rotation for the flexible elements, typically of the order of 5 to 10° in both directions, positive and negative, and a low and constant resistive torque.

It is known practice to produce a support device for a rotary shaft using a pivot that has crossed flexible webs, notably a pivot of the kind known by the name of "Bendix freeflex pivot". This type of pivot is not a through-pivot. It is therefore necessary to mount the supported shaft at one end only, in the manner of a cantilever, and this places significant stress on the webs of the pivot and transmits significant stress to the support structure, even in two-pivot setups. This type of pivot therefore offers limited mechanical integrity and transverse rigidity and does not satisfactorily meet all the requirements involved in creating a fine-pointing device.

It is also known practice to support a shaft using a device comprising two pivots consisting of ball bearings. A device such as this is subject to significant wear when subjected to reciprocating or oscillatory movements and therefore has a limited life. It too is unable satisfactorily to meet all the requirements involved in creating a fine-pointing device intended for space applications.

Patent application FR 2 703 415 describes a device for supporting a rotary shaft comprising a web-type through-pivot suited to the creation of a fine-pointing device, notably for space applications, although the angular capacity of the pivot is limited to small angles of rotation and becomes unsuitable as soon as the angular corrections required become greater.

It is an object of the invention to solve these problems and to propose a flexible-elements through-pivot with good mechanical integrity and ability to withstand the external forces and bending moments, good transverse rigidity, that allows high-precision play-free guidance, presents a low resistive torque, has a life able to withstand a great many rotational oscillations, at least in excess of 300 000, and that has an angular capability that is at least twice that of the pivot described in patent application FR 2 703 415.

SUMMARY OF THE INVENTION

To do that, the invention relates to a through-pivot comprising a first ring and a second ring, the two rings having symmetry of revolution about one and the same longitudinal axis, one of the two rings being able to rotate about the longitudinal axis with respect to the other ring, characterized in that it comprises at least one floating frame able to move about the longitudinal axis, and in that the two rings are connected to the floating frame by at least one first set and, respectively, at least one second set, of several flexible elements running in a direction that is transverse to the two rings.

Advantageously, the flexible elements of the first set have a first end connected to the floating frame and a second end, the opposite end to the first end, connected to the first ring, and the flexible elements of the second set have a first end connected to the floating frame, and a second end, the opposite end to the first end, connected to the second ring.

In a state of rest, the flexible elements may be arranged radially with respect to the two rings, or, alternatively, the flexible elements may be inclined by one and the same angle of inclination $\alpha$ with respect to radial directions of the rings and may be inclined in the same direction.

Alternatively, in a state of rest, the flexible elements connected to the first ring may be inclined by one and the same angle of inclination $\alpha$ with respect to radial directions of the first ring, and the flexible elements connected to the second ring may be inclined by one and the same angle of inclination $\alpha$ but in the opposite direction with respect to the direction in which the flexible elements are inclined.

The floating frame may be positioned on the outside of the two rings or on the inside of the two rings, indifferently.

The floating frame may be of one piece and have symmetry of revolution about the longitudinal axis or may be made up of several ring portions to which the first ends of the flexible elements are attached.

The flexible elements are preferably flexible webs.

Advantageously, at least one of the two rings has a through-hole, centred on the longitudinal axis, and able to accept a through-shaft passing through the said central hole.

In one embodiment of the invention, the first ring comprises at least one cylinder to which the second ends of the flexible elements are attached, and the second ring comprises at least one cylinder to which the second ends of the flexible elements are attached, the cylinders having the same outside diameter and being stacked along the longitudinal axis.

The invention also relates to a spacecraft comprising at least one through-pivot.

BRIEF DESCRIPTION OF THE DRAWINGS

The invention will be better understood and other objects, details, features and advantages thereof will become more clearly apparent in the course of the following description of a number of particular embodiments, which are given solely by way of nonlimiting illustration and with reference to the attached drawings which depict.

DETAILED DESCRIPTION

Figure 1:
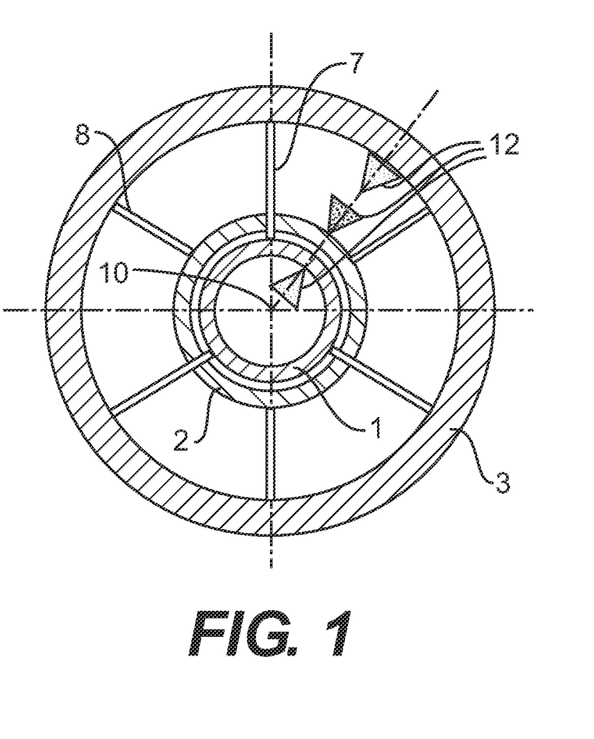
FIG. 1: a schematic depiction in cross section of one example of a two-stage pivot with an external floating frame and radial webs, in a centred position of rest, according to a first embodiment of the invention.
Figure 4:
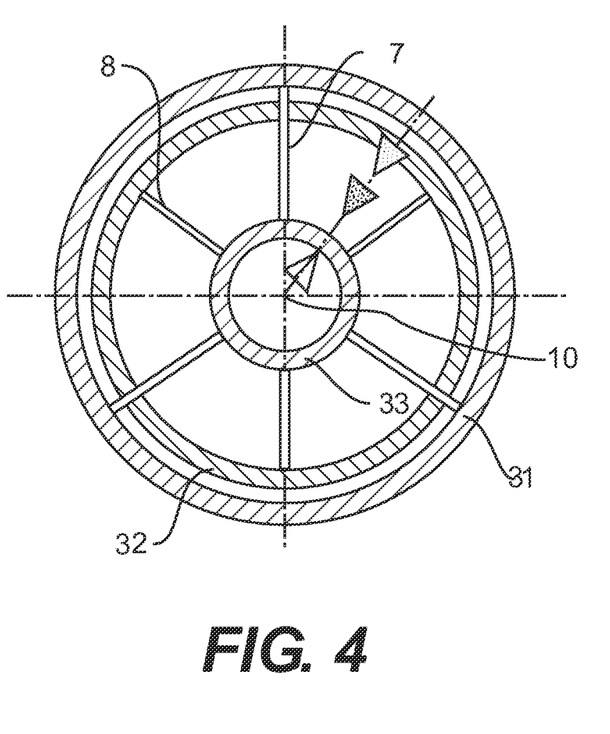
FIG. 4: a schematic depiction in cross section of one example of a two-stage pivot with an internal floating frame, according to a second embodiment of the invention.
Figure 5A:
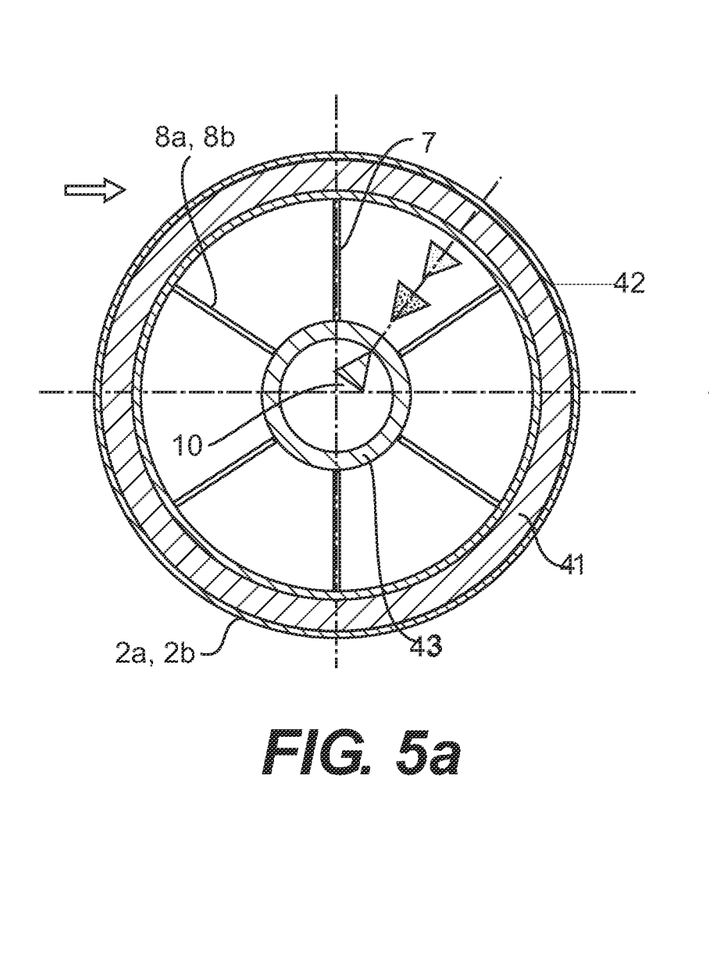
FIGS. 5*a*, 5*b*: two schematic depictions, in cross section and in side view respectively, of an example of a two-stage pivot with superposed fixed and moving rings, according to a third embodiment of the invention.
Figure 8:
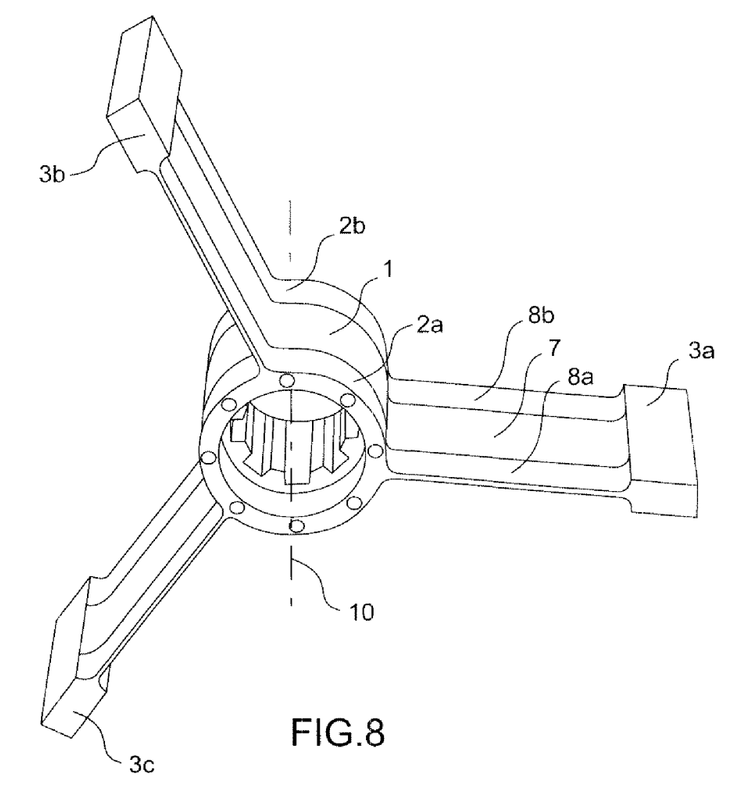
FIGS. 8 and 9: two perspective views of two examples of two-stage pivots according to the fourth and fifth embodiments of the invention respectively.
Figure 9:
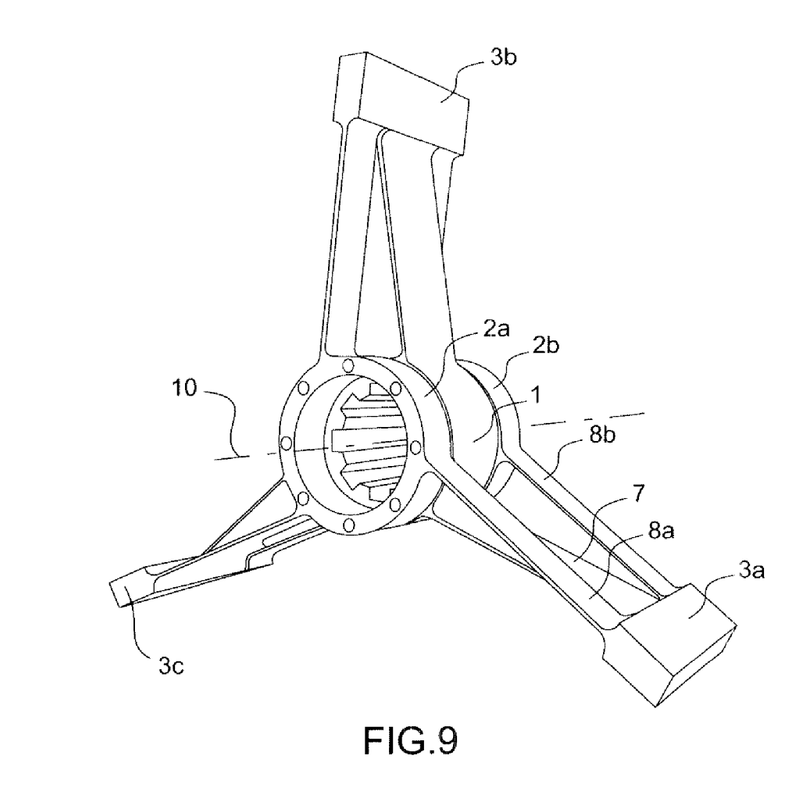
Figure 10A:
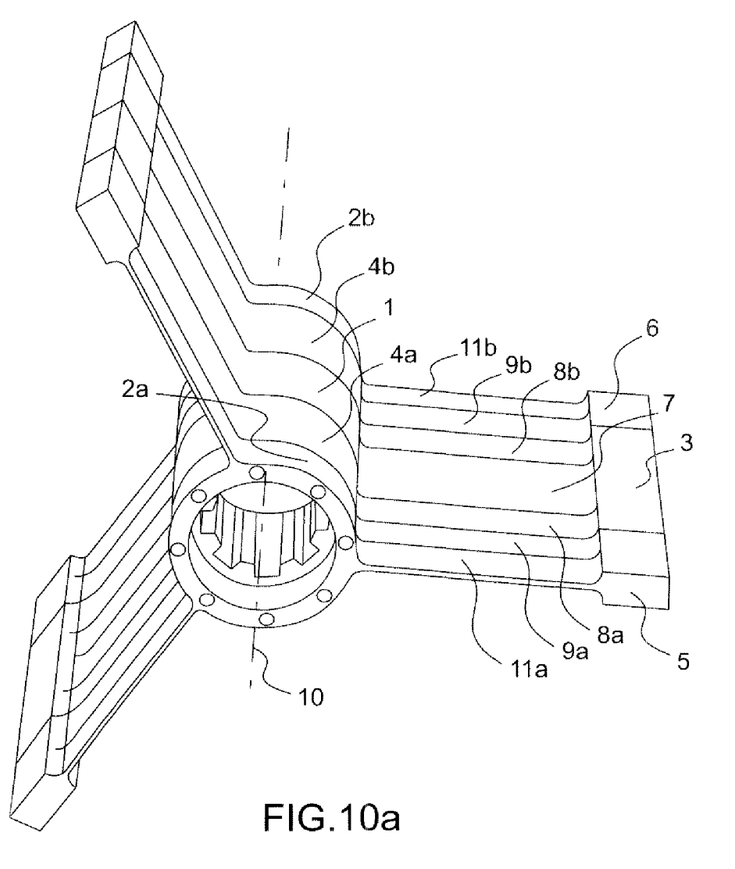
FIGS. 10*a* and 10*b*: two views, one in perspective and one side-on, of an example of a pivot with more than two stages, according to the invention.
Figure 10B:
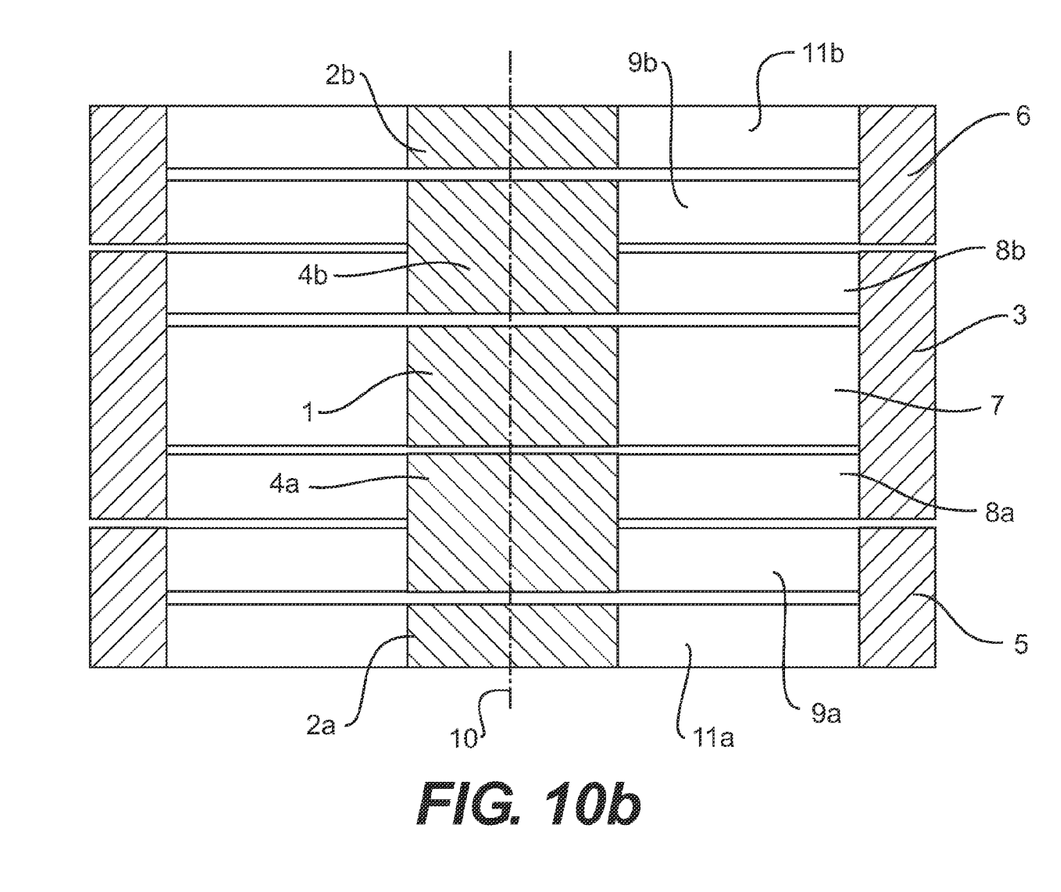

The pivot depicted schematically in cross section in FIG. 1 comprises a first ring 1 and a second ring 2, the two rings being in the form of cylinders of revolution, of longitudinal axis 10. One of the rings, for example the ring 2, is able to rotate about the axis 10 and constitutes a rotor, and the other ring, for example the ring 1, is fixed and constitutes a stator. Alternatively, the role of the rings 1 and 2 may be reversed. The rotor, for example the ring 2, is intended to be connected to an actuator, not depicted, and the stator, for example the ring 1, is attached to a fixed structure, not depicted. At least the rotor has a through-hole centred on the longitudinal axis 10 and able to accept a through-shaft passing through the said central hole. Each of the rings 1 and 2 is connected to a floating frame 3 by respective flexible elements 7, 8 such as flexible webs for example, it being possible for the floating frame to be positioned on the outside of the two rings 1 and 2 as depicted in FIGS. 1 to 3 and 6 to 9 or on the inside of the two rings 1 and 2 as depicted in FIGS. 4 and 5. The floating frame may, for example, comprise a third ring in the form of a cylinder of revolution about the axis 10, as depicted in FIG. 1, or may be made up of several independent separate elements 3*a*, 3*b*, 3*c* forming ring portions evenly distributed about a circumference of the rotor and of the stator and connected to the upper ends of the flexible elements 7, 8, as depicted in FIGS. 8, 9, 10. Alternatively, the floating frame could be located on the inside of the rotor and of the stator as depicted in FIG. 5*a*. Each flexible element 7 or 8 may for example consist of one or more webs of the flat rectangular sheet type having a lower end attached to the first or, respectively, to the second, ring and an upper end attached to the floating frame 3. Each flexible web 7, 8 extends in a transverse direction and outwards with respect to the fixed and moving rings 1, 2. The floating frame 3 is not connected to any actuator or to any fixed structure and is therefore free to turn according to the movement of the flexible webs 7, 8.

In the exemplary embodiments schematically depicted in the various figures, the first ring 1, which may be a fixed ring, is connected to the floating frame 3 by a first set of three flexible webs 7 which are angularly spaced, for example 120° apart, and the second ring 2, which may be a moving ring, is connected to the floating frame 3 by a second set of three flexible webs 8 spaced angularly, for example 120° apart. Of course, the number of flexible webs in each set of webs is not restricted to three and the spacing between the webs of one and the same set may be other than 120°.

Figure 6A:
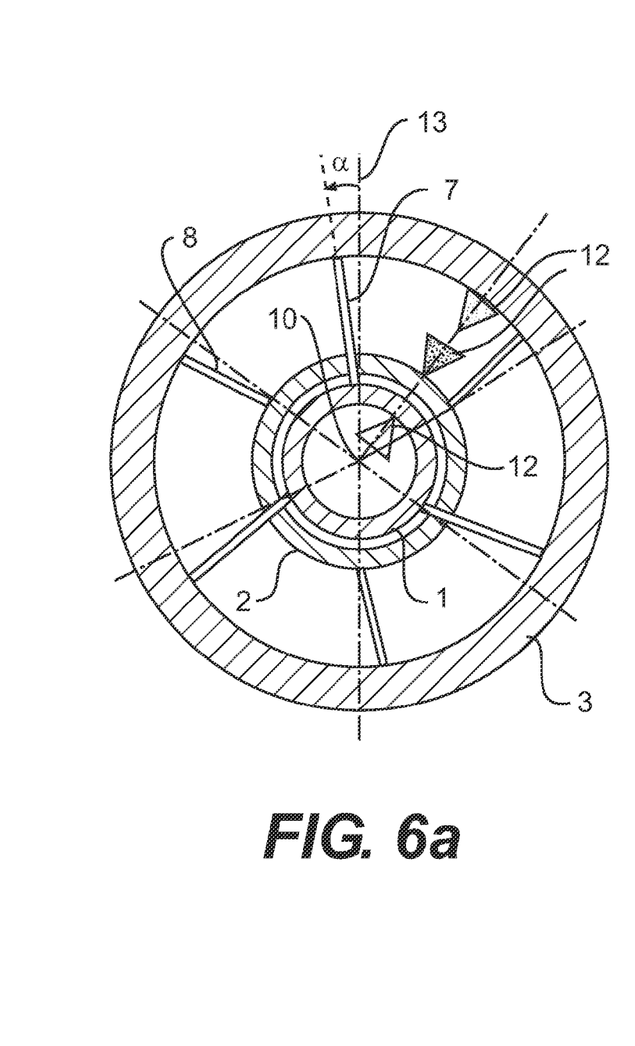
FIGS. 6*a*, 6*b*: a schematic depiction in cross section of one example of a two-stage pivot with an internal floating frame and webs inclined in one and the same direction, according to a fourth embodiment of the invention, and an example of a graph showing the relationship between the applied torque and the angle of rotation obtained with this type of pivot, for various angles of inclination.
Figure 7A:
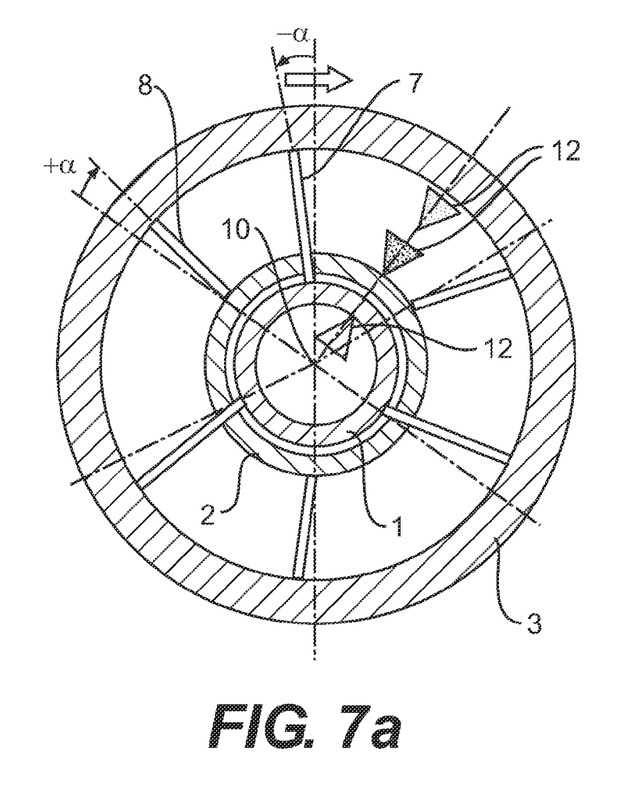
FIGS. 7*a*, 7*b*: a schematic depiction in cross section of one example of a two-stage pivot with an internal floating frame and with webs inclined in two opposing directions, according to a fifth embodiment of the invention, and an example of a graph showing the relationship between the applied torque and the angle of rotation obtained with this type of pivot, for various angles of inclination.

In a position of rest identified by the three arrows 12, that is to say when there is no torque urging the rings to turn, each flexible web 7, 8 may be arranged in a transverse direction that coincides with a radial direction of the rings and that passes through the longitudinal axis 10 as depicted in FIGS. 1, 4 and 5*a* or in a transverse direction that makes a non-zero angle of inclination $\alpha$ with respect to a radial direction of the rings as depicted in FIGS. 6*a* and 7*a*. When the angle of inclination $\alpha$ is non-zero, the webs do not converge towards the axis 10 situated at the centre of the pivot, and this allows the webs to operate essentially in bending and obtain a greater capacity for angular movement than can be obtained with radial webs which, for the same angle of rotation, will switch between modes of operation involving tension and compression. For example, the angle of inclination $\alpha$ may range between 2° and 10° and preferably between 4° and 5°.

Figure 2:
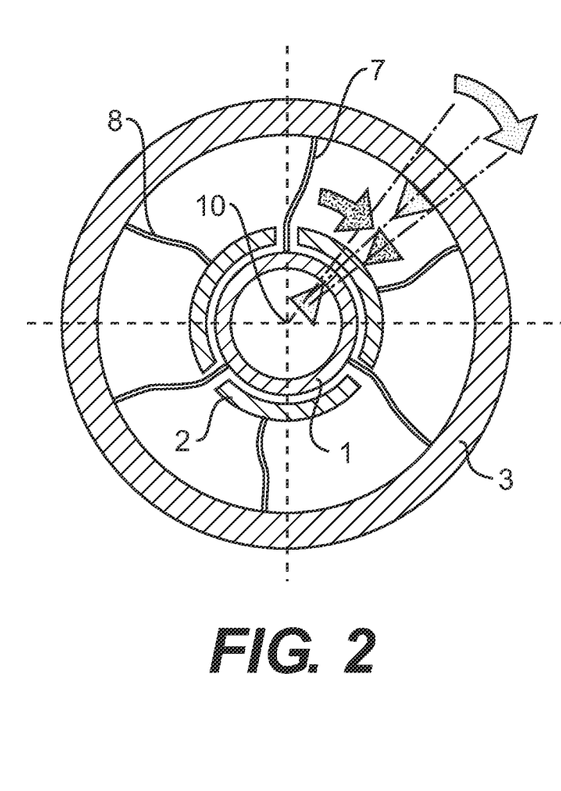
FIG. 2: a schematic depiction in cross section of one example of a two-stage pivot in a positive-rotation position, according to the first embodiment of the invention.
Figure 3:
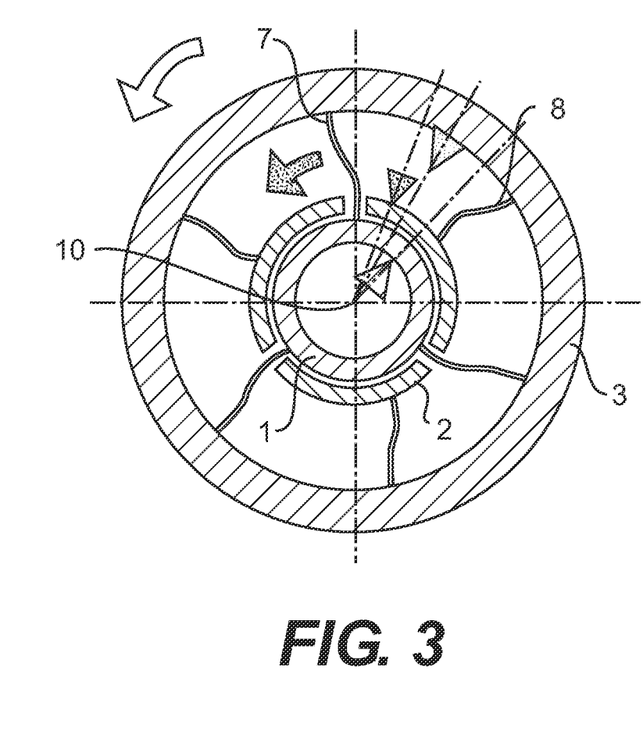
FIG. 3: a schematic depiction in cross section of one example of a two-stage pivot in a negative-rotation position, according to the first embodiment of the invention.

FIGS. 2 and 3 show the deformation of the flexible webs 7, 8 when the second ring 2 rotates about the longitudinal axis 10 in a positive direction corresponding to the clockwise direction (as shown by the arrow in FIG. 2) or, respectively, in a negative direction corresponding to the anti-clockwise direction (as shown by the arrow in FIG. 3). If the moving ring that forms the rotor is the second ring 2 and the fixed ring that forms the stator connected to a fixed support is the first ring 1 then, starting from the position of rest, a rotational movement of the second ring 2 in the positive direction, corresponding to the clockwise direction, will cause the floating frame 3 to rotate in a positive direction through the agency of the flexible webs 8 of the second set of webs and will cause the flexible webs 7 of the first set of webs to become buckled through the agency of the floating frame 3. If the second ring 2 is rotated in the negative direction, the pivot will operate in a similar way, but the work of the flexible webs will be reversed.

The pivot also operates in a similar way if a floating frame 33 is formed on the inside of a first ring 31, and a second ring 32, as depicted for example in the second embodiment of FIG. 4.

Figure 5B:
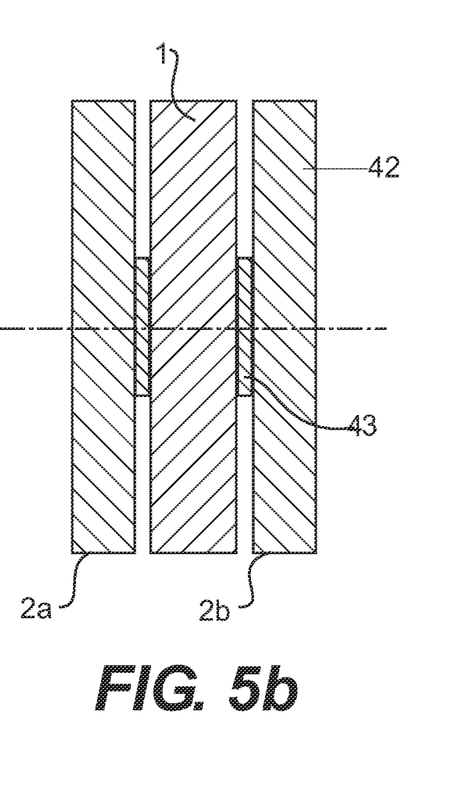

The third embodiment of FIGS. 5a and 5b corresponds to the case where a moving, second ring 42 and a fixed, first ring 41 have the same outside diameter and are arranged in superposed mutually parallel different planes. The moving, second ring 42 has two identical distinct annular parts 2a, 2b arranged symmetrically on each side of the fixed ring 41. In this case, some of the flexible elements 8a, 8b need to be duplicated so that each of the two parts 2a, 2b of the moving, second ring 42 can be connected to a floating frame 43 which, in this embodiment, is positioned on the inside of the two rings 41 and 42.

In a fourth embodiment of the invention and in a centred position of rest identified in FIG. 6a by the three arrows 12, the flexible webs 7, 8 of the first and of the second set of webs are inclined by an angle α in one and the same direction, for example in the anti-clockwise direction known as the negative direction, with respect to the radial directions of the rings, which have been depicted in dotted line 13 in FIG. 6a. In this case, if the moving ring that constitutes the rotor is the second ring 2 and the fixed ring that constitutes the stator connected to a fixed support is the first ring 1, then starting out from a position of rest, a rotational movement of the moving second ring 2 in the positive direction that corresponds to the clockwise direction causes the floating frame 3 to rotate in the positive direction and causes the flexible webs 7 of the first set to buckle, while the flexible webs 8 of the second set do not buckle because of the direction in which they are inclined.

Furthermore, starting out from the position of rest, a rotational movement of the moving ring 2 in the negative direction causes the flexible webs 8 of the second set of webs to buckle.

In a fifth embodiment of the invention and in an eccentric position of rest, identified in FIG. 7a by the three arrows 12, the flexible webs 7, 8 of the first and of the second sets of webs are inclined by an angle α but in two opposite directions. For example, the flexible webs 7 of the first set are inclined in the negative direction, angle −α, with respect to the radial directions of the rings 1, 2 whereas the flexible webs 8 of the second set are inclined in the positive direction, by an angle +α. In this embodiment, the pivot works in just one direction of rotation corresponding to the positive direction as depicted in FIG. 7. Starting out from the position of rest, a rotational movement of the moving ring 2 in the positive direction causes the flexible webs 8 of the second set of webs to rotate, this causing the third ring 3 to rotate in the positive direction and causing the flexible webs 7 of the first set to buckle.

In the various embodiments of the pivot according to the invention, the fixed, first ring 1 is not connected directly to the moving, second ring 2, as in the pivots of the prior art, but the two, fixed and moving, rings are connected through the agency of the floating frame 3 and of an additional set of webs which constitutes a second stage of the pivot, the two sets of webs 7, 8 operating in series. This structure makes it possible, by using equivalent flexible webs of the same stiffness, to obtain an angular capacity which is twice that of a single-stage pivot structure.

Figure 6B:
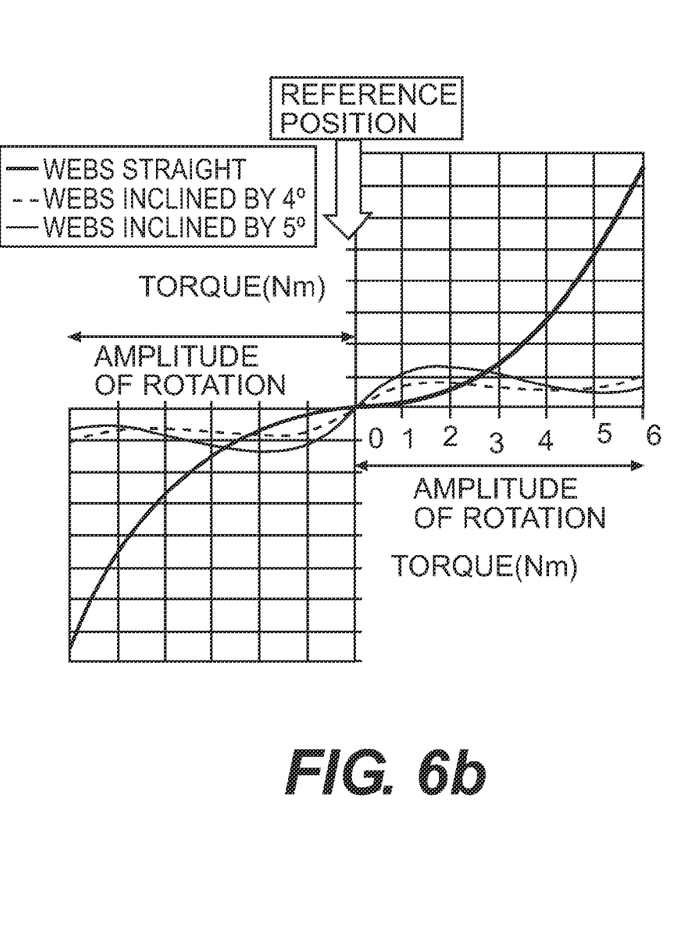
Figure 7B:
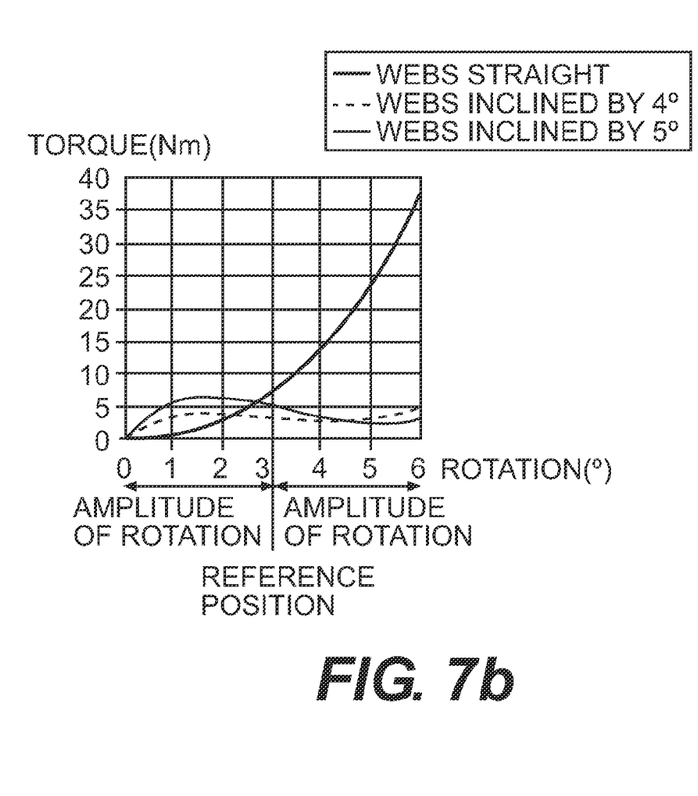

The sample graphs depicted in FIGS. 6b and 7b show, for various angles of inclination, the amplitude of rotation obtained as a function of the torque applied to the moving ring for a pivot produced according to the fourth embodiment of the invention corresponding to FIG. 6a and, respectively, to the fifth embodiment of the invention corresponding to FIG. 7a. In the graph of FIG. 6b, the pivot oscillates about a reference position corresponding to the position at rest with an angular amplitude extending to as much as 6°. In the graph of FIG. 7b, the pivot oscillates about a reference position chosen, for example, to be equal to 3°. However, these values are given purely by way of nonlimiting example and it is possible to create pivots with greater angular capacities. The angular capacity is dependent on the material, the length and the cross section of the flexible webs used. The longer and thinner the webs, the more flexible they are and the greater their angular capacity, although they are less well able to bear load. The choice of the dimensions and of the materials of the webs will therefore be dependent on the desired application and on the desired angular capacity.

The perspective view in FIG. 8 depicts one embodiment of a pivot, in a centred position of rest, according to the third embodiment of the invention in which the floating frame 3 is made up of three separate elements 3a, 3b, 3c forming ring portions evenly distributed about a circumference of the rotor and of the stator and to which the upper ends of all the flexible webs 7, 8 are attached. The first ring 1, which is fixed, and the second ring 2, which is moving, are both made up of hollow cylinders of revolution, with the same longitudinal axis 10 and with the same outside diameter, stacked up along the longitudinal axis 10. The central cylinder, which may be the first ring 1, may be connected for example to an actuator and the two cylinders 2a, 2b, which are arranged symmetrically on each side of the first ring 1, may be joined together by a fixed structure that has not been depicted. All the webs 7, 8 of the two sets of flexible webs are located at the same level, are of the same length, and are inclined by the same angle with respect to a radial direction and in one and the same direction of inclination. Each web 7 has a lower end attached to the central cylinder 1 and an upper end connected to an element 3a, 3b, 3c of the floating frame. Each web 8 is made up of two half-webs 8a, 8b each having a lower end attached to one of the cylinders 2a, 2b respectively and an upper end connected to one and the same element 3a, 3b, 3c of the floating frame. The two half-webs 8a, 8b of each web 8 of the second set of flexible webs are arranged on each side of a web 7 of the first set of flexible webs. The first ring 1 may have a splined interior surface able, for example, to accept a shaft fixed firmly to this surface. Dividing the moving, second ring 2 into two cylinders 2a, 2b positioned symmetrically on each side of a first ring 1 allows for a better distribution of the loads applied to the pivot and thus improves the life thereof. Alternatively, it is possible to reverse the role of the first ring 1, which may be fixed and of the two outer cylinders 2a, 2b which may be able to move, the key point being that there is relative movement between the inner and outer rings, e.g., the first ring 1 and the second ring 2, of the pivot.

The perspective view of FIG. 9 depicts one exemplary embodiment of a pivot, in an eccentric position of rest, according to the second embodiment of the invention in which the floating frame 3 is made up of three separate elements 3a, 3b, 3c to which the upper ends of all the flexible webs 7, 8 are attached. In this exemplary embodiment of the invention, the difference in relation to FIG. 8 lies in the direction in which the webs are inclined at rest. The two half-webs 8a, 8b of each web 8 are inclined by one and the same angle with respect to a radial direction and in one and the same direction of inclination, whereas the webs 7 are inclined by one and the same angle with respect to a radial direction, but in the opposite direction to the direction in which the webs 8 are inclined.

All the foregoing exemplary embodiments relate to pivots with two stages of flexible webs which, for the same web dimensions, provide twice the angular capacity of a pivot that has just one single stage of webs. However, in order to obtain an even greater angular capacity, it is possible in the same way to produce pivots with more than two stages.

The perspective and side-on views of FIGS. 10*a* and 10*b* depict an example of a multi-stage web-type through-pivot with four stages of seven sets 7, 8*a*, 8*b*, 9*a*, 9*b*, 11*a*, 11*b* of three flexible webs angularly distributed over an inner ring comprising an inner cylinder 1, an outer ring comprising two outer cylinders 2*a*, 2*b* situated symmetrically on each side of the inner ring and five, inner 4*a*, 4*b* and outer 3, 5, 6, floating frames, the flexible webs being attached respectively to the various floating frames and to the various cylinders. The three floating frames 3, 5, 6 are made up of three separate elements but alternatively could be made up of annular rings. The fourth stage is made up of 4 sets of outer flexible webs 9*a*, 9*b* and 11*a*, 11*b* attached to the two outer cylinders 2*a*, 2*b* of the outer ring, it being possible for the said outer cylinders to be connected to one another for example through the agency of a fixed structure that has not been depicted.

Although the invention has been described in conjunction with particular embodiments, it is quite clear that it is not in any way restricted thereto and that it encompasses all technical equivalents of the means described and combinations thereof where these fall within the scope of the invention. The number of flexible webs in each set may notably be other than three.

The invention claimed is:

1. A through-pivot comprising:
    a first ring and a second ring, the two rings being stacked along and having a symmetry of revolution about one and the same longitudinal axis, one of the two rings being able to rotate about the longitudinal axis with respect to the other ring, and
    at least one floating frame able to rotate about the longitudinal axis and positioned on the inside of the two rings, the two rings being connected to the same floating frame by at least one first set and, respectively, at least one second set, of several flexible elements running in a direction that is transverse to the two rings,
    wherein the second ring comprises two identical distinct annular parts arranged symmetrically on each side of the first ring, each annular part being connected to the same floating frame.

2. The through-pivot according to claim 1, wherein the flexible elements of the first set have a first end connected to the floating frame and a second end, the opposite end to the first end, connected to the first ring, and in that the flexible elements of the second set have a first end connected to the floating frame, and a second end, the opposite end to the first end, connected to the second ring.

3. The through-pivot according to claim 2, wherein, in a state during which zero torque is applied to any of the rings, the flexible elements are arranged radially with respect to the two rings.

4. The through-pivot according to claim 2, wherein, in a state during which zero torque is applied to any of the rings, the flexible elements are inclined by one and the same angle of inclination ($\alpha$) with respect to radial directions of the rings and are inclined in the same direction.

5. The through-pivot according to claim 4, wherein the same angle of inclination ($\alpha$) is between 2° and 10°.

6. The through-pivot according to claim 4, wherein the same angle of inclination ($\alpha$) is between 4° and 5°.

7. The through-pivot according to claim 2, wherein, in a state during which zero torque is applied to any of the rings, the flexible elements connected to the first ring are inclined by one and the same angle of inclination ($\alpha$) with respect to radial directions of the first ring, and in that the flexible elements connected to the second ring are inclined by one and the same angle of inclination ($\alpha$) but in the opposite direction with respect to the direction in which the flexible elements are inclined.

8. The through-pivot according to claim 7, wherein the floating frame is of one piece and has symmetry of revolution about the longitudinal axis.

9. The through-pivot according to claim 7, wherein the floating frame is made up of several ring portions to which the first ends of the flexible elements are attached.

10. The through-pivot according to claim 9, wherein the flexible elements are flexible webs.

11. The through-pivot according to claim 10, wherein at least one of the two rings has a through-hole, centred on the longitudinal axis, and able to accept a through-shaft passing through the said central hole.

12. The through-pivot according to claim 11, wherein the first ring comprises at least one cylinder to which the second ends of the flexible elements are attached, and in that the second ring comprises at least one cylinder to which the second ends of the flexible elements are attached, the cylinders having the same outside diameter and being stacked along the longitudinal axis.

13. The through-pivot according to claim 7, wherein the same angle of inclination ($\alpha$) is between 2° and 10°.

14. The through-pivot according to claim 7, wherein the same angle of inclination ($\alpha$) is between 4° and 5°.

15. The through-pivot according to claim 1, wherein the at least one floating frame able to rotate about the longitudinal axis with respect to the two rings, and is positioned radially inside each of the first ring and the second ring.

16. The through-pivot according to claim 1, wherein the first set of flexible elements includes three flexible webs.

17. The through-pivot according to claim 16, wherein the three flexible webs of the first set are angularly spaced 120° apart.

18. The through-pivot according to claim 1, wherein the second set of flexible elements includes three flexible webs.

19. The through-pivot according to claim 18, wherein the three flexible webs of the second set are angularly spaced 120° apart.

20. The through-pivot according to claim 1, wherein the first set of flexible elements includes a first plurality of flexible webs,
    wherein the second set of flexible elements includes a second plurality of flexible webs, and
    wherein each flexible web of the first plurality of flexible webs and the second plurality of flexible webs are angularly spaced apart.

* * * * *